United States Patent
Papallo et al.

(10) Patent No.: US 8,213,144 B2
(45) Date of Patent: Jul. 3, 2012

(54) CIRCUIT PROTECTION SYSTEM

(75) Inventors: Thomas F. Papallo, Farmington, CT (US); Gregory P. Lavoie, Bristol, CT (US); David G. Fletcher, Simsbury, CT (US); Ertugrul Berkcan, Clifton Park, NY (US); William James Premerlani, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/765,913

(22) Filed: Jun. 20, 2007

(65) Prior Publication Data

US 2007/0242402 A1 Oct. 18, 2007

Related U.S. Application Data

(63) Continuation of application No. 10/373,583, filed on Feb. 25, 2003, now Pat. No. 7,254,001.

(60) Provisional application No. 60/359,544, filed on Feb. 25, 2002, provisional application No. 60/438,159, filed on Jan. 6, 2003.

(51) Int. Cl.
*H02H 3/00* (2006.01)

(52) U.S. Cl. ........................................ 361/63

(58) Field of Classification Search ............... 361/63
See application file for complete search history.

(56) References Cited

U.S. PATENT DOCUMENTS

| | | | |
|---|---|---|---|
| 3,772,505 A | 11/1973 | Massell | |
| 3,938,007 A | 2/1976 | Boniger et al. | |
| 3,956,671 A | 5/1976 | Nimmersjo | |
| 3,963,964 A | 6/1976 | Mustaphi | |
| 4,001,742 A | 1/1977 | Jencks et al. | |
| 4,245,318 A | 1/1981 | Eckart et al. | |
| 4,291,299 A | 9/1981 | Hinz et al. | |
| 4,301,433 A | 11/1981 | Castonguay et al. | |
| 4,311,919 A | 1/1982 | Nail | |
| 4,415,968 A | 11/1983 | Maeda et al. | |
| 4,423,459 A | 12/1983 | Stich et al. | |
| 4,432,031 A | 2/1984 | Premerlani | |
| 4,455,612 A | 6/1984 | Girgis et al. | |
| 4,468,714 A | 8/1984 | Russell | |
| 4,589,074 A | 5/1986 | Thomas et al. | |

(Continued)

FOREIGN PATENT DOCUMENTS

EP 0718948 A2 6/1996

(Continued)

OTHER PUBLICATIONS

Antanackovic D. et al. An Integrated Knowledge-Based Model for Power-System Planning IEEE Expert, IEEE Inc. New York, Jul. 1997; pp. 65-71.

*Primary Examiner* — Jared Fureman
*Assistant Examiner* — Scott Bauer
(74) *Attorney, Agent, or Firm* — Cantor Colburn LLP

(57) ABSTRACT

A method and apparatus is disclosed for providing protection against arc flash during maintenance on a low voltage power circuit including a circuit breaker having a specified trip function for responding to a fault is provided. The specified trip function is overridden with a maintenance trip function that results in reduced arc energy in the fault during a trip over arc energy during a trip with the specified trip function. The specified trip function is restored following maintenance.

15 Claims, 9 Drawing Sheets

U.S. PATENT DOCUMENTS

| | | | |
|---|---|---|---|
| 4,623,949 A | 11/1986 | Salowe et al. |
| 4,631,625 A | 12/1986 | Alexander et al. |
| 4,642,724 A | 2/1987 | Ruta |
| 4,652,966 A | 3/1987 | Farag et al. |
| 4,672,501 A | 6/1987 | Bilac et al. |
| 4,672,555 A | 6/1987 | Hart et al. |
| 4,674,062 A | 6/1987 | Premerlani |
| 4,689,712 A | 8/1987 | Demeyer |
| 4,709,339 A | 11/1987 | Fernandes |
| 4,751,653 A | 6/1988 | Junk et al. |
| 4,752,853 A | 6/1988 | Matsko et al. |
| 4,754,407 A | 6/1988 | Nolan |
| 4,777,607 A | 10/1988 | Maury et al. |
| 4,783,748 A | 11/1988 | Swarztrauber et al. |
| 4,796,027 A | 1/1989 | Smith-Vaniz |
| 4,833,592 A | 5/1989 | Yamanaka |
| 4,849,848 A | 7/1989 | Ishii |
| 4,855,671 A | 8/1989 | Fernandes |
| 4,862,308 A | 8/1989 | Udren |
| 4,964,058 A | 10/1990 | Brown, Jr. |
| 4,979,122 A | 12/1990 | Davis et al. |
| 4,983,955 A | 1/1991 | Ham, Jr. et al. |
| 4,996,646 A | 2/1991 | Farrington |
| 5,053,735 A | 10/1991 | Ohishi et al. |
| 5,060,166 A | 10/1991 | Engel et al. |
| 5,101,191 A | 3/1992 | MacFadyen et al. |
| 5,134,691 A | 7/1992 | Elms |
| 5,136,458 A | 8/1992 | Durivage, III |
| 5,162,664 A | 11/1992 | Haun et al. |
| 5,166,887 A | 11/1992 | Farrington et al. |
| 5,170,310 A | 12/1992 | Studtmann et al. |
| 5,170,360 A | 12/1992 | Porter et al. |
| 5,179,376 A | 1/1993 | Pomatto |
| 5,182,547 A | 1/1993 | Griffith |
| 5,185,705 A | 2/1993 | Farrington |
| 5,196,831 A | 3/1993 | Bscheider |
| 5,214,560 A | 5/1993 | Jensen |
| 5,216,621 A | 6/1993 | Dickens |
| 5,225,994 A | 7/1993 | Arinobu et al. |
| 5,231,565 A | 7/1993 | Bilas et al. |
| 5,237,511 A | 8/1993 | Caird et al. |
| 5,247,454 A | 9/1993 | Farrington et al. |
| 5,253,159 A | 10/1993 | Bilas et al. |
| 5,272,438 A | 12/1993 | Stumme |
| 5,301,121 A | 4/1994 | Garverick et al. |
| 5,305,174 A | 4/1994 | Morita et al. |
| 5,311,392 A | 5/1994 | Kinney et al. |
| 5,323,307 A | 6/1994 | Wolf et al. |
| 5,353,188 A | 10/1994 | Hatakeyama |
| 5,361,184 A | 11/1994 | El-Sharkawi et al. |
| 5,367,427 A | 11/1994 | Matsko et al. |
| 5,369,356 A | 11/1994 | Kinney et al. |
| 5,381,554 A | 1/1995 | Langer et al. |
| 5,384,712 A | 1/1995 | Oravetz et al. |
| 5,402,299 A | 3/1995 | Bellei |
| 5,406,495 A | 4/1995 | Hill |
| 5,414,635 A | 5/1995 | Ohta |
| 5,420,799 A | 5/1995 | Peterson et al. |
| 5,422,778 A | 6/1995 | Good et al. |
| 5,440,441 A | 8/1995 | Ahuja |
| 5,451,879 A | 9/1995 | Moore |
| 5,487,016 A | 1/1996 | Elms |
| 5,490,086 A | 2/1996 | Leone et al. |
| 5,493,468 A | 2/1996 | Hunter et al. |
| 5,530,738 A | 6/1996 | McEachern |
| 5,534,782 A | 7/1996 | Nourse |
| 5,534,833 A | 7/1996 | Castonguay et al. |
| 5,537,327 A | 7/1996 | Snow et al. |
| 5,544,065 A | 8/1996 | Engel et al. |
| 5,559,719 A | 9/1996 | Johnson et al. |
| 5,560,022 A | 9/1996 | Dunstan et al. |
| 5,576,625 A | 11/1996 | Sukegawa et al. |
| 5,581,471 A | 12/1996 | McEachern et al. |
| 5,587,917 A | 12/1996 | Elms |
| 5,596,473 A | 1/1997 | Johnson et al. |
| 5,600,527 A | 2/1997 | Engel et al. |
| 5,608,646 A | 3/1997 | Pomatto |
| 5,613,798 A | 3/1997 | Braverman |
| 5,619,392 A | 4/1997 | Bertsch et al. |
| 5,627,716 A | 5/1997 | Lagree et al. |
| 5,627,717 A | 5/1997 | Pein et al. |
| 5,627,718 A | 5/1997 | Engel et al. |
| 5,629,825 A | 5/1997 | Wallis et al. |
| 5,631,798 A | 5/1997 | Seymour et al. |
| 5,638,296 A | 6/1997 | Johnson et al. |
| 5,650,936 A | 7/1997 | Loucks et al. |
| 5,661,658 A | 8/1997 | Putt et al. |
| 5,666,256 A | 9/1997 | Zavis et al. |
| 5,670,923 A | 9/1997 | Gonzalez et al. |
| 5,694,329 A | 12/1997 | Pomatto |
| 5,696,695 A | 12/1997 | Ehlers et al. |
| 5,719,738 A | 2/1998 | Singer et al. |
| 5,734,576 A | 3/1998 | Klancher |
| 5,736,847 A | 4/1998 | Van Doorn et al. |
| 5,737,231 A | 4/1998 | Pyle et al. |
| 5,742,513 A | 4/1998 | Bouhenguel et al. |
| 5,751,524 A | 5/1998 | Swindler |
| 5,754,033 A | 5/1998 | Thomson |
| 5,754,440 A | 5/1998 | Cox et al. |
| 5,768,148 A | 6/1998 | Murphy et al. |
| 5,784,237 A | 7/1998 | Velez |
| 5,784,243 A | 7/1998 | Pollman et al. |
| 5,786,699 A | 7/1998 | Sukegawa et al. |
| 5,812,389 A | 9/1998 | Katayama et al. |
| 5,821,704 A | 10/1998 | Carson et al. |
| 5,825,643 A | 10/1998 | Dvorak et al. |
| 5,828,576 A | 10/1998 | Loucks et al. |
| 5,828,983 A | 10/1998 | Lombardi |
| 5,831,428 A | 11/1998 | Pyle et al. |
| 5,867,385 A | 2/1999 | Brown et al. |
| 5,872,722 A * | 2/1999 | Oravetz et al. ................. 700/292 |
| 5,872,785 A | 2/1999 | Kienberger |
| 5,875,088 A | 2/1999 | Matsko et al. |
| 5,890,097 A | 3/1999 | Cox |
| 5,892,449 A | 4/1999 | Reid et al. |
| 5,903,426 A | 5/1999 | Ehling |
| 5,905,616 A | 5/1999 | Lyke |
| 5,906,271 A | 5/1999 | Castonguay et al. |
| 5,926,089 A | 7/1999 | Sekiguchi et al. |
| 5,936,817 A | 8/1999 | Matsko et al. |
| 5,946,210 A | 8/1999 | Montminy et al. |
| 5,958,060 A | 9/1999 | Premerlani |
| 5,963,457 A | 10/1999 | Kanoi et al. |
| 5,973,481 A | 10/1999 | Thompson et al. |
| 5,973,899 A | 10/1999 | Williams et al. |
| 5,982,595 A | 11/1999 | Pozzuoli |
| 5,982,596 A | 11/1999 | Spencer et al. |
| 5,995,911 A | 11/1999 | Hart |
| 6,005,757 A | 12/1999 | Shvach et al. |
| 6,005,758 A | 12/1999 | Spencer et al. |
| 6,018,451 A | 1/2000 | Lyke et al. |
| 6,038,516 A | 3/2000 | Alexander et al. |
| 6,047,321 A | 4/2000 | Raab et al. |
| 6,054,661 A | 4/2000 | Castonguay et al. |
| 6,055,145 A | 4/2000 | Lagree et al. |
| 6,061,609 A | 5/2000 | Kanoi et al. |
| 6,084,758 A | 7/2000 | Clarey et al. |
| 6,138,241 A | 10/2000 | Eckel et al. |
| 6,139,327 A | 10/2000 | Callahan et al. |
| 6,141,196 A | 10/2000 | Premerlani et al. |
| 6,157,527 A | 12/2000 | Spencer et al. |
| 6,167,329 A | 12/2000 | Engel et al. |
| 6,175,780 B1 | 1/2001 | Engel |
| 6,185,482 B1 | 2/2001 | Egolf et al. |
| 6,185,508 B1 | 2/2001 | Van Doorn et al. |
| 6,186,842 B1 | 2/2001 | Hirschbold et al. |
| 6,195,243 B1 | 2/2001 | Spencer et al. |
| 6,198,402 B1 | 3/2001 | Hasegawa et al. |
| 6,212,049 B1 | 4/2001 | Spencer et al. |
| 6,233,128 B1 | 5/2001 | Spencer et al. |
| 6,236,949 B1 | 5/2001 | Hart |
| 6,242,703 B1 | 6/2001 | Castonguay et al. |
| 6,268,991 B1 | 7/2001 | Criniti et al. |
| 6,285,917 B1 | 9/2001 | Sekiguchi et al. |
| 6,288,882 B1 | 9/2001 | DiSalvo et al. |
| 6,289,267 B1 | 9/2001 | Alexander et al. |
| 6,291,911 B1 | 9/2001 | Dunk et al. |

| | | |
|---|---|---|
| 6,292,340 B1 | 9/2001 | O'Regan et al. |
| 6,292,717 B1 | 9/2001 | Alexander et al. |
| 6,292,901 B1 | 9/2001 | Lys et al. |
| 6,297,939 B1 | 10/2001 | Bilac et al. |
| 6,313,975 B1 | 11/2001 | Dunne et al. |
| 6,330,141 B1 | 12/2001 | Elms |
| 6,341,054 B1 | 1/2002 | Walder et al. |
| 6,347,027 B1 | 2/2002 | Nelson et al. |
| 6,351,823 B1 | 2/2002 | Mayer et al. |
| 6,356,422 B1 | 3/2002 | Bilac et al. |
| 6,356,849 B1 | 3/2002 | Jaffe |
| 6,369,996 B1 | 4/2002 | Bo |
| 6,377,051 B1 | 4/2002 | Tyner et al. |
| 6,385,022 B1 | 5/2002 | Kulidjian et al. |
| 6,396,279 B1 | 5/2002 | Gruenert |
| 6,397,155 B1 | 5/2002 | Przydatek et al. |
| 6,405,104 B1 | 6/2002 | Dougherty |
| 6,406,328 B1 | 6/2002 | Attarian et al. |
| 6,411,865 B1 | 6/2002 | Qin et al. |
| 6,441,931 B1 | 8/2002 | Moskovich et al. |
| 6,459,997 B1 | 10/2002 | Anderson |
| 6,496,342 B1 | 12/2002 | Horvath et al. |
| 6,535,797 B1 | 3/2003 | Bowles et al. |
| 6,549,880 B1 | 4/2003 | Willoughby et al. |
| 6,553,418 B1 | 4/2003 | Collins et al. |
| 6,621,672 B2 * | 9/2003 | Bilac .................... 361/44 |
| 2001/0010032 A1 | 7/2001 | Ehlers et al. |
| 2001/0032025 A1 | 10/2001 | Lenz et al. |
| 2001/0044588 A1 | 11/2001 | Mault |
| 2001/0048354 A1 | 12/2001 | Douville et al. |
| 2001/0055965 A1 | 12/2001 | Delp et al. |
| 2002/0010518 A1 | 1/2002 | Reid et al. |
| 2002/0032535 A1 | 3/2002 | Alexander et al. |
| 2002/0034086 A1 | 3/2002 | Scoggins et al. |
| 2002/0045992 A1 | 4/2002 | Shincovich et al. |
| 2002/0059401 A1 | 5/2002 | Austin |
| 2002/0063635 A1 | 5/2002 | Shincovich |
| 2002/0064010 A1 | 5/2002 | Nelson et al. |
| 2002/0091949 A1 | 7/2002 | Ykema |
| 2002/0094799 A1 | 7/2002 | Elliott et al. |
| 2002/0107615 A1 | 8/2002 | Bjorklund |
| 2002/0108065 A1 | 8/2002 | Mares |
| 2002/0109722 A1 | 8/2002 | Rogers et al. |
| 2002/0111980 A1 | 8/2002 | Miller et al. |
| 2002/0116092 A1 | 8/2002 | Hamamatsu et al. |
| 2002/0124011 A1 | 9/2002 | Baxter et al. |
| 2002/0146076 A1 | 10/2002 | Lee |
| 2002/0146083 A1 | 10/2002 | Lee et al. |
| 2002/0147503 A1 | 10/2002 | Osburn, III |
| 2002/0159402 A1 | 10/2002 | Binder |
| 2002/0162014 A1 | 10/2002 | Przydatek et al. |
| 2002/0163918 A1 | 11/2002 | Cline |
| 2002/0165677 A1 | 11/2002 | Lightbody et al. |
| 2002/0181174 A1 | 12/2002 | Bilac et al. |
| 2002/0193888 A1 | 12/2002 | Wewalaarachchi et al. |
| 2003/0043785 A1 | 3/2003 | Liu et al. |
| 2005/0219775 A1 * | 10/2005 | Shipp et al. ................ 361/5 |

FOREIGN PATENT DOCUMENTS

| | | |
|---|---|---|
| EP | 0723325 A1 | 7/1996 |
| EP | 0949734 A2 | 10/1999 |

* cited by examiner

CIRCUIT PROTECTION SYSTEM

CROSS-REFERENCE TO RELATED APPLICATIONS

This application is a continuation application of U.S. patent application Ser. No. 10/373,583, filed Feb. 25, 2003, allowed and pending, which claims the benefit of U.S. provisional patent application Ser. No. 60/359,544, filed on Feb. 25, 2002, and U.S. provisional patent application Ser. No. 60/438,159 filed on Jan. 6, 2003, the contents all of which are incorporated herein by reference in their entirety.

BACKGROUND OF THE INVENTION

This invention relates generally to power distribution systems including circuit breakers, and more particularly to a method and apparatus for a circuit protection system providing adjustable circuit breaker trip curves in-situ.

In power distribution systems, power is distributed to various loads and is typically divided into branch circuits, which supply power to specified loads. The branch circuits also can be connected to various other power distribution equipment, such as, transformers that step down the supply voltage for use by a specific piece of electrical equipment.

Due to the concern of an abnormal power condition in the system, i.e., a fault, it is known to provide circuit protective devices, e.g., circuit breakers to protect the various loads, as well as the power distribution equipment. The circuit breakers seek to prevent or minimize damage and typically function automatically. The circuit breakers also seek to minimize the extent and duration of electrical service interruption in the event of a fault.

It is further known to utilize upstream circuit breakers having pre-programmed time delays so that the downstream circuit breakers are provided with an opportunity to clear the fault before the upstream circuit breaker opens or trips. In a known zone selective interlock system, a downstream circuit breaker can be in direct communication with an upstream circuit breaker through wiring such that the downstream circuit breaker sends a signal to the upstream circuit breaker placing the upstream circuit breaker in a restrained mode. In the restrained mode, the circuit breaker temporarily restrains from opening or tripping until after a pre-determined time delay has timed out. The circuit breakers each have pre-programmed time delay settings incorporated therein. This type of system provides for time delays based upon pre-set, invariable time periods associated with the upstream circuit breaker. Thus, the upstream circuit breaker will delay tripping by a pre-set period of time regardless of the location of the fault in the power distribution system.

The circuit breakers, can be arranged in a hierarchy or tree configuration having a plurality of layers or levels with the upstream circuit breakers closer to the power source and the downstream circuit breakers closer to the loads. In order to minimize service interruption, the circuit breaker nearest the fault will first attempt to interrupt the fault current. If this first circuit breaker does not timely clear the fault, then the next upstream circuit breaker will attempt to do so. However, this can result in the problem of a circuit breaker multiple levels upstream from a fault being tripped when the fault is detected, which causes power loss to the multiple levels of loads downstream that should otherwise be unaffected.

Such a system does not delay the upstream circuit breakers based upon an optimal time period to provide the downstream circuit breaker with the opportunity to clear the fault. Where a circuit has downstream circuit branches and circuit breakers having differing temporal properties, such as, for example, clearing time or pre-set delay time of the circuit breakers, such a system fails to account for these differences. This increases the risk of damage to the system where an upstream circuit breaker has a pre-set time delay that is too long based on the location of the fault. This also decreases the efficiency of the system where an upstream circuit breaker has a pre-set time delay that is too short based on the location of the fault and opens before the downstream circuit breaker has a full opportunity to clear the fault. This system also suffers from the drawback of the need to hardwire the upstream circuit breakers with each of the downstream circuit breakers. In a multi-tiered and multi-source system, this can require a complex and costly wiring scheme.

Accordingly, there is a need for circuit protection systems incorporated into power distribution systems that decrease the risk of damage and increase efficiency of the power distribution system. There is a further need for protection systems that can vary the zones of protection and the time delays of protection as the power distribution system changes and provide optimized protection without sacrificing selectivity.

SUMMARY OF THE INVENTION

In one aspect, a method of protecting a circuit having a first circuit breaker and a second circuit breaker downstream of the first circuit breaker is provided. The method comprises detecting a fault in the circuit with the fault being downstream of the second circuit breaker, determining a dynamic delay time for opening the first circuit breaker, and opening the first circuit breaker after the dynamic delay time has elapsed.

In another aspect, a method of protecting a circuit having a first circuit breaker arranged upstream of a plurality of second circuit breakers is provided. The method comprises detecting a fault in the circuit, determining a location of the fault, determining a dynamic delay time for opening the first circuit breaker based at least in part upon the location of the fault, and delaying opening the first circuit breaker until after the dynamic delay time has elapsed.

In yet another aspect, a protection system coupled to a circuit having a first circuit breaker arranged upstream of a plurality of second circuit breakers is provided. The system comprises a network and at least one control processing unit operatively controlling the first circuit breaker and the plurality of second circuit breakers. The network is communicatively coupled to the circuit, the first circuit breaker, the plurality of second circuit breakers and the control processing unit. The control processing unit determines a dynamic delay time for opening the first circuit breaker if a fault is detected in the circuit. The control processing unit delays opening the first circuit breaker until after the dynamic delay time has elapsed.

In a further aspect, a power distribution system is provided which comprises a circuit having a plurality of circuit breakers, at least one power source and at least one load. The plurality of circuit breakers are arranged with at least one first circuit breaker upstream of a plurality of second circuit breakers. The system further comprises a network and at least one control processing unit operatively controlling the plurality of circuit breakers. The network is communicatively coupled to the control processing unit and the circuit. The control processing unit determines a dynamic delay time for opening the first circuit breaker if a fault is detected in the circuit. The control processing unit delays opening the first circuit breaker until after the dynamic delay time has elapsed.

In yet a further aspect of the invention, a method of providing protection against arc flash during maintenance on a low voltage power circuit including a circuit breaker having a specified trip function for responding to a fault is provided. The specified trip function is overridden with a maintenance trip function that results in reduced arc energy in the fault during a trip over arc energy during a trip with the specified trip function, and the specified trip function is restored following maintenance.

In another aspect of the invention, a low voltage circuit breaker protecting from arc flash resulting from faults in a protected low voltage power circuit is provided. The circuit breaker includes separable contacts, current sensors sensing current in the protected low voltage power circuit, a trip unit responsive to the current sensors tripping open the separable contacts in response to a specified trip function, and maintenance means overriding the specified trip function with a maintenance trip function that results in reduced arc energy in the fault during a trip over arc energy during a trip with the specified trip function.

The above-described and other features and advantages of the present disclosure will be appreciated and understood by those skilled in the art from the following detailed description, drawings, and appended claims.

DETAILED DESCRIPTION OF THE INVENTION

Figure 1:
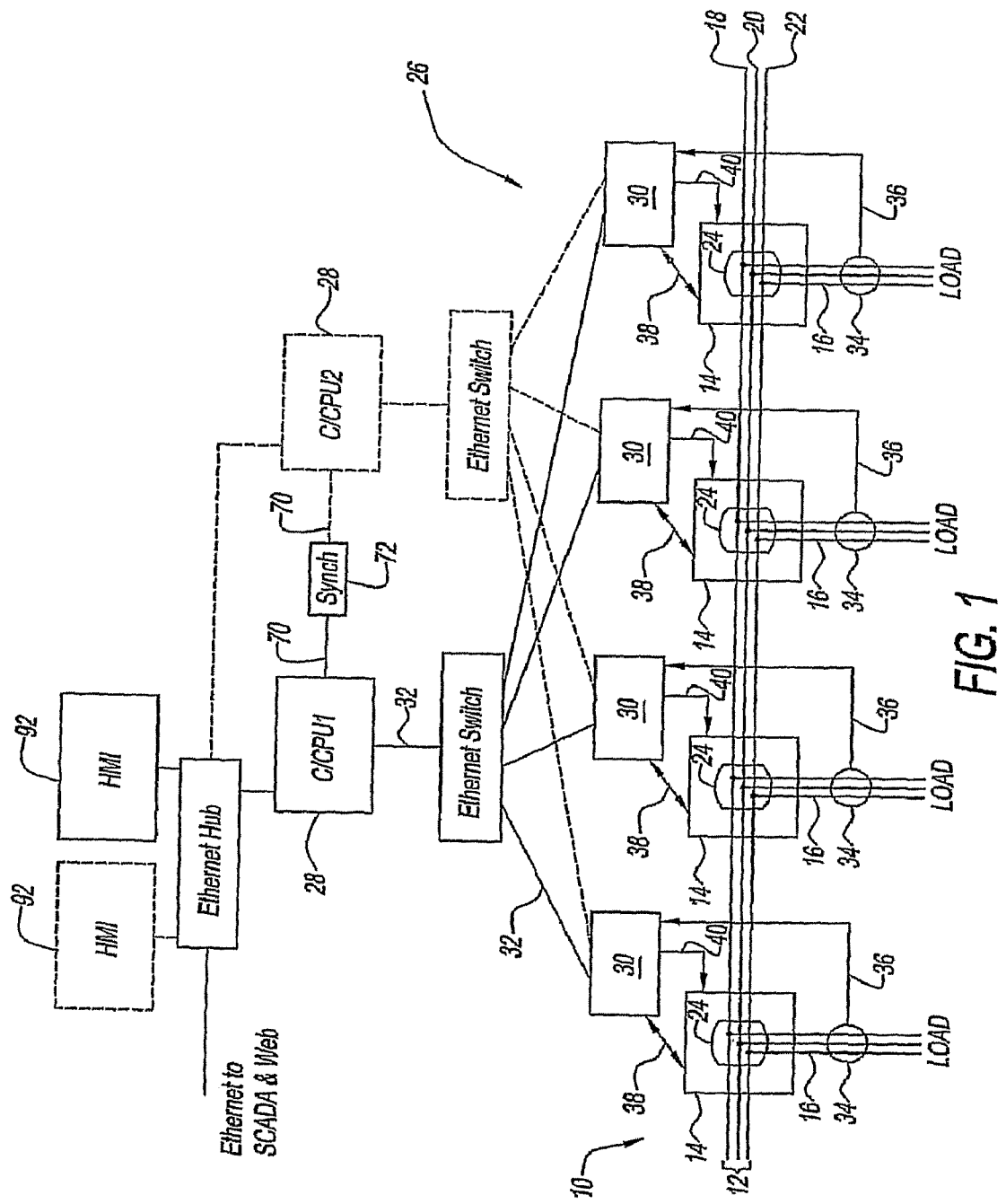
FIG. 1 is a schematic illustration of a power distribution system.

Referring now to the drawings and in particular to FIG. 1, an exemplary embodiment of a power distribution system generally referred to by reference numeral 10 is illustrated. System 10 distributes power from at least one power bus 12 through a number or plurality of circuit breakers 14 to branch circuits 16.

Power bus 12 is illustrated by way of example as a three-phase power system having a first phase 18, a second phase 20, and a third phase 22. Power bus 12 can also include a neutral phase (not shown). System 10 is illustrated for purposes of clarity distributing power from power bus 12 to four circuits 16 by four breakers 14. Of course, it is contemplated by the present disclosure for power bus 12 to have any desired number of phases and/or for system 10 to have any desired number of circuit breakers 14.

Each circuit breaker 14 has a set of separable contacts 24 (illustrated schematically). Contacts 24 selectively place power bus 12 in communication with at least one load (also illustrated schematically) on circuit 16. The load can include devices, such as, but not limited to, motors, welding machinery, computers, heaters, lighting, and/or other electrical equipment.

Power distribution system 10 is illustrated in FIG. 1 with an exemplary embodiment of a centrally controlled and fully integrated protection, monitoring, and control system 26 (hereinafter "system"). System 26 is configured to control and monitor power distribution system 10 from a central control processing unit 28 (hereinafter "CCPU"). CCPU 28 communicates with a number or plurality of data sample and transmission modules 30 (hereinafter "module") over a data network 32. Network 32 communicates all of the information from all of the modules 30 substantially simultaneously to CCPU 28.

Thus, system 26 can include protection and control schemes that consider the value of electrical signals, such as current magnitude and phase, at one or all circuit breakers 14. Further, system 26 integrates the protection, control, and monitoring functions of the individual breakers 14 of power distribution system 10 in a single, centralized control processor (e.g., CCPU 28). System 26 provides CCPU 28 with all of a synchronized set of information available through digital communication with modules 30 and circuit breakers 14 on network 32 and provides the CCPU with the ability to operate these devices based on this complete set of data.

Specifically, CCPU 28 performs all primary power distribution functions for power distribution system 10. Namely, CCPU 28 performs all instantaneous overcurrent protection (IOC), short time overcurrent, longtime overcurrent, relay protection, and logic control as well as digital signal processing logged in single, central location, i.e., CCPU 28. CCPU 28 is described herein by way of example as a central processing unit. Of course, it is contemplated by the present disclosure for CCPU 28 to include any programmable circuit, such as, but not limited to, computers, processors, microcontrollers, microcomputers, programmable logic controllers, application specific integrated circuits, and other programmable circuits.

As shown in FIG. 1, each module 30 is in communication with one of the circuit breakers 14. Each module 30 is also in communication with at least one sensor 34 sensing a condition or electrical parameter of the power in each phase (e.g., first phase 18, second phase 20, third phase 22, and neutral) of bus 12 and/or circuit 16. Sensors 34 can include current transformers (CTs), potential transformers (PTs), and any combination thereof. Sensors 34 monitor a condition or electrical parameter of the incoming power in circuits 16 and provide a first or parameter signal 36 representative of the condition of the power to module 30. For example, sensors 34 can be current transformers that generate a secondary current proportional to the current in circuit 16 so that first signals 36 are the secondary current.

Module 30 sends and receives one or more second signals 38 to and/or from circuit breaker 14. Second signals 38 can be representative of one or more conditions of breaker 14, such as, but not limited to, a position or state of separable contacts 24, a spring charge switch status, a lockout state or condition, and others. In addition, module 30 is configured to operate or actuate circuit breaker 14 by sending one or more third signals 40 to the breaker to open/close separable contacts 24 as desired, such as, open/close commands or signals. In a first embodiment, circuit breakers 14 cannot open separable contacts 24 unless instructed to do so by system 26.

System 26 utilizes data network 32 for data acquisition from modules 30 and data communication to the modules. Accordingly, network 32 is configured to provide a desired level of communication capacity and traffic management between CCPU 28 and modules 30. In an exemplary embodiment, network 32 can be configured to not enable communication between modules 30 (i.e., no module-to-module communication).

In addition, system 26 can be configured to provide a consistent fault response time. As used herein, the fault response time of system 26 is defined as the time between when a fault condition occurs and the time module 30 issues an trip command to its associated breaker 14. In an exemplary embodiment, system 26 has a fault response time that is less than a single cycle of the 60 Hz (hertz) waveform. For example, system 26 can have a maximum fault response time of about three milliseconds.

The configuration and operational protocols of network 32 are configured to provide the aforementioned communication capacity and response time. For example, network 32 can be an Ethernet network having a star topology as illustrated in FIG. 1. In this embodiment, network 32 is a full duplex network having the collision-detection multiple-access (CSMA/CD) protocols typically employed by Ethernet networks removed and/or disabled. Rather, network 32 is a switched Ethernet for managing collision domains.

In this configuration, network 32 provides a data transfer rate of at least about 100 Mbps (megabits per second). For example, the data transfer rate can be about 1 Gbps (gigabits per second). Additionally, communication between CCPU 28 and modules 30 across network 32 can be managed to optimize the use of network 32. For example, network 32 can be optimized by adjusting one or more of a message size, a message frequency, a message content, and/or a network speed.

Accordingly, network 32 provides for a response time that includes scheduled communications, a fixed message length, full-duplex operating mode, and a switch to prevent collisions so that all messages are moved to memory in CCPU 28 before the next set of messages is scheduled to arrive. Thus, system 26 can perform the desired control, monitoring, and protection functions in a central location and manner.

It should be recognized that data network 32 is described above by way of example only as an Ethernet network having a particular configuration, topography, and data transmission protocols. Of course, the present disclosure contemplates the use of any data transmission network that ensures the desired data capacity and consistent fault response time necessary to perform the desired range of functionality. The exemplary embodiment achieves sub-cycle transmission times between CCPU 28 and modules 30 and full sample data to perform all power distribution functions for multiple modules with the accuracy and speed associated with traditional devices.

CCPU 28 can perform branch circuit protection, zone protection, and relay protection interdependently because all of the system information is in one central location, namely at the CCPU. In addition, CCPU 28 can perform one or more monitoring functions on the centrally located system information. Accordingly, system 26 provides a coherent and integrated protection, control, and monitoring methodology not considered by prior systems. For example, system 26 integrates and coordinates load management, feed management, system monitoring, and other system protection functions in a low cost and easy to install system.

Figure 2:
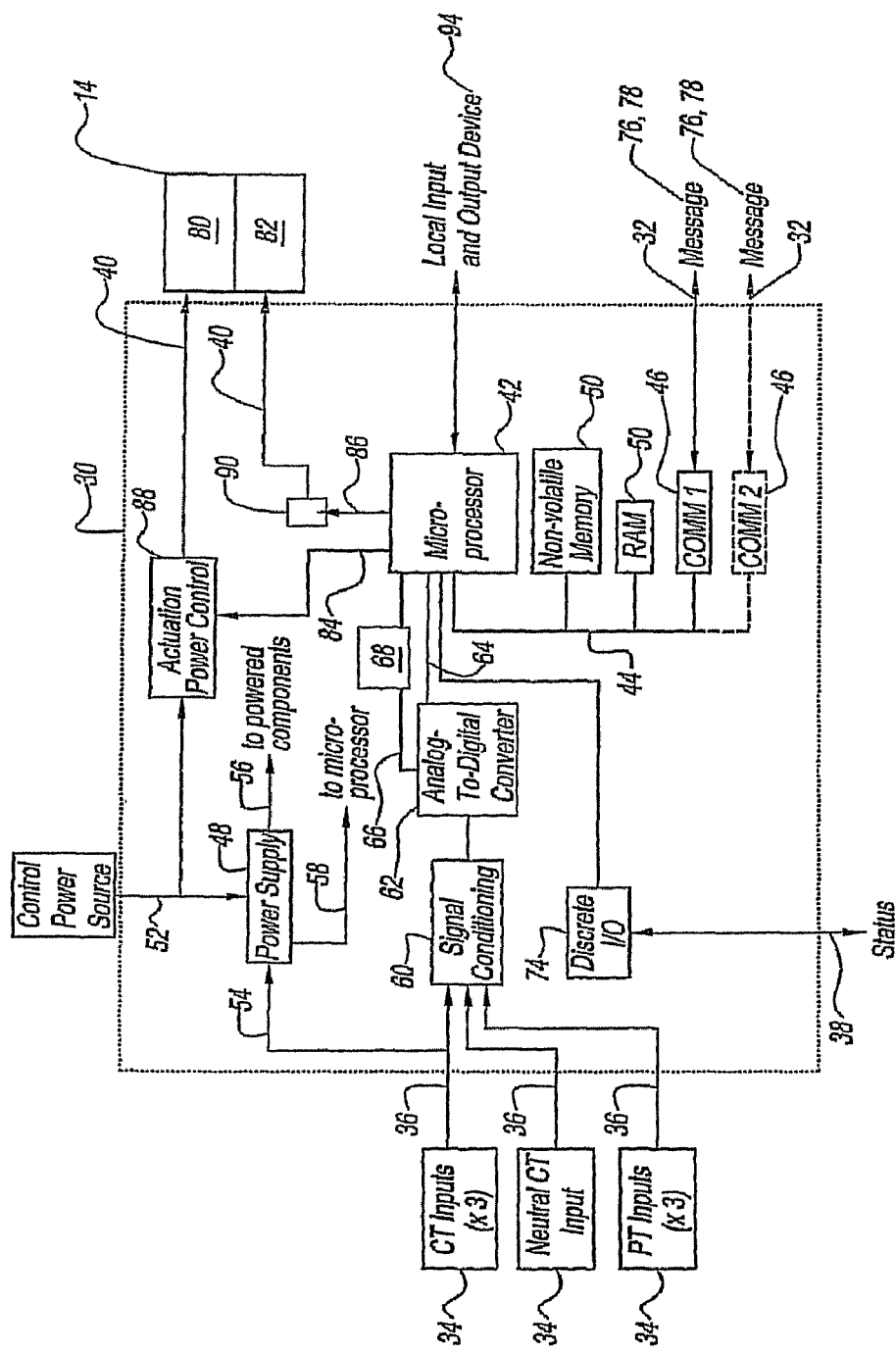
FIG. 2 is a schematic illustration of a module of the power distribution system of FIG. 1.

An exemplary embodiment of module 30 is illustrated in FIG. 2. Module 30 has a microprocessor 42, a data bus 44, a network interface 46, a power supply 48, and one or more memory devices 50.

Power supply 48 is configured to receive power from a first source 52 and/or a second source 54. First source 52 can be one or more of an uninterruptible power supply (not shown), a plurality of batteries (not shown), a power bus (not shown) and other sources. In the illustrated embodiment, second source 54 is the secondary current available from sensors 34.

Power supply 48 is configured to provide power 56 to module 30 from first and second sources 52, 54. For example, power supply 48 can provide power 56 to microprocessor 42, data bus 42, network interface 44, and memory devices 50. Power supply 48 is also configured to provide a fourth signal 58 to microprocessor 42. Fourth signal 58 is indicative of what sources are supplying power to power supply 48. For example, fourth signal 58 can indicate whether power supply 48 is receiving power from first source 52, second source 54, or both of the first and second sources.

Network interface 46 and memory devices 50 communicate with microprocessor 42 over data bus 44. Network interface 46 can be connected to network 32 so that microprocessor 42 is in communication with CCPU 28.

Microprocessor 42 receives digital representations of first signals 36 and second signals 38. First signals 36 are continuous analog data collected by sensors 34, while second signals 38 are discrete analog data from breaker 14. Thus, the data sent from modules 30 to CCPU 28 is a digital representation of the actual voltages, currents, and device status. For example, first signals 36 can be analog signals indicative of the current and/or voltage in circuit 16.

Accordingly, system 26 provides the actual raw parametric or discrete electrical data (i.e., first signals 36) and device physical status (i.e., second signal 38) to CCPU 28 via network 32, rather than processed summary information sampled, created, and stored by devices such as trip units, meters, or relays. As a result, CCPU 28 has complete, raw system-wide data with which to make decisions and can therefore operate any or all breakers 14 on network 32 based on information derived from as many modules 30 as the control and protection algorithms resident in CCPU 28 require.

Module 30 has a signal conditioner 60 and an analog-digital converter 62. First signals 36 are conditioned by signal conditioner 60 and converted to digital signals 64 by A/D converter 62. Thus, module 30 collects first signals 36 and presents digital signals 64, representative of the raw data in the first signals, to microprocessor 42. For example, signal conditioner 60 can includes a filtering circuit (not shown) to improve a signal-to-noise ratio first signal 36, a gain circuit (not shown) to amplify the first signal, a level adjustment circuit (not shown) to shift the first signal to a pre-determined range, an impedance match circuit (not shown) to facilitate transfer of the first signal to A/D converter 62, and any combination thereof. Further, A/D converter 62 can be a sample-and-hold converter with external conversion start signal 66 from microprocessor 42 or a clock circuit 68 controlled by microprocessor 42 to facilitate synchronization of digital signals 64.

It is desired for digital signals 64 from all of the modules 30 in system 26 to be collected at substantially the same time. Specifically, it is desired for digital signals 64 from all of the modules 30 in system 26 to be representative of substantially the same time instance of the power in power distribution system 10 .

Modules 30 sample digital signals 64 based, at least in part, upon a synchronization signal or instruction 70 as illustrated in FIG. 1. Synchronization instruction 70 can be generated from a synchronizing clock 72 that is internal or external to CCPU 28. Synchronization instruction 70 is simultaneously communicated from CCPU 28 to modules 30 over network 32. Synchronizing clock 72 sends synchronization instructions 70 at regular intervals to CCPU 28, which forwards the instructions to all modules 30 on network 32.

Modules 30 use synchronization instruction 70 to modify a resident sampling protocol. For example, each module 30 can have a synchronization algorithm resident on microprocessor 42. The synchronization algorithm resident on microprocessor 42 can be a software phase-lock-loop algorithm. The software phase-lock-loop algorithm adjusts the sample period of module 30 based, in part, on synchronization instructions 70 from CCPU 28. Thus, CCPU 28 and modules 30 work together in system 26 to ensure that the sampling (i.e., digital signals 64) from all of the modules in the system are synchronized.

Accordingly, system 26 is configured to collect digital signals 64 from modules 30 based in part on synchronization instruction 70 so that the digital signals are representative of the same time instance, such as being within a predetermined time-window from one another. Thus, CCPU 28 can have a set of accurate data representative of the state of each monitored location (e.g., modules 30) within the power distribution system 10. The predetermined time-window can be less than about ten microseconds. For example, the predetermined time-window can be about five microseconds.

The predetermined time-window of system 26 can be affected by the port-to-port variability of network 32. In an exemplary embodiment, network 32 has a port-to-port variability of in a range of about 24 nanoseconds to about 720 nanoseconds. In an alternate exemplary embodiment, network 32 has a maximum port-to-port variability of about 2 microseconds.

It has been determined that control of all of modules 30 to this predetermined time-window by system 26 enables a desired level of accuracy in the metering and vector functions across the modules, system waveform capture with coordinated data, accurate event logs, and other features. In an exemplary embodiment, the desired level of accuracy is equal to the accuracy and speed of traditional devices. For example, the predetermined time-window of about ten microseconds provides an accuracy of about 99% in metering and vector functions.

Second signals 38 from each circuit breaker 14 to each module 30 are indicative of one or more conditions of the circuit breaker. Second signals 38 are provided to a discrete I/O circuit 74 of module 30. Circuit 74 is in communication with circuit breaker 14 and microprocessor 42. Circuit 74 is configured to ensure that second signals 38 from circuit breaker 14 are provided to microprocessor 42 at a desired voltage and without jitter. For example, circuit 74 can include de-bounce circuitry and a plurality of comparators.

Microprocessor 42 samples first and second signals 36, 38 as synchronized by CCPU 28. Then, converter 62 converts the first and second signals 36, 38 to digital signals 64, which is packaged into a first message 76 having a desired configuration by microprocessor 42. First message 76 can include an indicator that indicates which synchronization signal 70 the first message was in response to. Thus, the indicator of which synchronization signal 70 first message 76 is responding to is returned to CCPU 28 for sample time identification.

CCPU 28 receives first message 76 from each of the modules 30 over network 32 and executes one or more protection and/or monitoring algorithms on the data sent in all of the first messages. Based on first message 76 from one or more modules 30, CCPU 28 can control the operation of one or more circuit breakers 14. For example, when CCPU 28 detects a fault from one or more of first messages 76, the CCPU sends a second message 78 to one or more modules 30 via network 32, such as open or close commands or signals, or circuit breaker actuation or de-actuation commands or signals.

In response to second message 78, microprocessor 42 causes third signal 40 to operate or actuate (e.g., open contacts 24) circuit breaker 14. Circuit breaker 14 can include more than one operation or actuation mechanism. For example, circuit breaker 14 can have a shunt trip 80 and a magnetically held solenoid 82. Microprocessor 42 is configured to send a first output 84 to operate shunt trip 80 and/or a second output 86 to operate solenoid 82. First output 84 instructs a power control module 88 to provide third signal 40 (i.e., power) to shunt trip 80, which can separate contacts 24. Second output 86 instructs a gating circuit 90 to provide third signal 40 to solenoid 82 (i.e., flux shifter) to separate contacts 24. It should be noted that shunt trip 80 requires first source 52 to be present, while solenoid 82 can be operated when only second source 54 is present. In this manner, microprocessor 42 can operate circuit breaker 14 in response to second message 78 regardless of the state of first and second sources 52, 54. Additionally, a lockout device can be provided that is operably connected to circuit breaker 14.

In addition to operating circuit breaker 14, module 30 can communicate to one or more local input and/or output devices 94. For example, local output device 94 can be a module status indicator, such as a visual or audible indicator. In one embodiment, device 94 is a light emitting diode (LED) configured to communicate a status of module 30. In another embodiment, local input device 94 can be a status-modifying button for manually operating one or more portions of module 30. In yet another embodiment, local input device 94 is a module interface for locally communicating with module 30.

Accordingly, modules 30 are adapted to sample first signals 36 from sensors 34 as synchronized by the CCPU. Modules 30 then package the digital representations (i.e., digital signals 64) of first and second signals 36, 38, as well as other information, as required into first message 76. First message 76 from all modules 30 are sent to CCPU 28 via network 32. CCPU 28 processes first message 76 and generates and stores instructions to control the operation of each circuit breaker 14 in second message 78. CCPU 28 sends second message 78 to all of the modules 30. In an exemplary embodiment, CCPU 28 sends second message 78 to all of the modules 30 in response to synchronization instruction 70.

Accordingly, system 26 can control each circuit breaker 14 based on the information from that breaker alone, or in combination with the information from one or more of the other breakers in the system 26. Under normal operating conditions, system 26 performs all monitoring, protection, and control decisions at CCPU 28.

Since the protection and monitoring algorithms of system 26 are resident in CCPU 28, these algorithms can be enabled without requiring hardware or software changes in circuit breaker 14 or module 30. For example, system 26 can include a data entry device 92, such as a human-machine-interface (HMI), in communication with CCPU 28. In this embodiment, one or more attributes and functions of the protection and monitoring algorithms resident on CCPU 28 can easily be modified from data entry device 92. Thus, circuit breaker 14 and module 30 can be more standardized than was possible with the circuit breakers/trip units of prior systems. For example, over one hundred separate circuit breakers/trip units have been needed to provide a full range of sizes normally required for protection of a power distribution system. However, the generic nature of circuit breaker 14 and module 30 enabled by system 26 can reduce this number by over sixty percent. Thus, system 26 can resolve the inventory issues, retrofittability issues, design delay issues, installation delay issues, and cost issues of prior power distribution systems.

It should be recognized that system 26 is described above as having one CCPU 28 communication with modules 30 by way of a single network 32. However, it is contemplated by the present disclosure for system 26 to have redundant CCPUs 28 and networks 32 as illustrated in phantom in FIG. 1. For example, module 30 is illustrated in FIG. 2 having two network interfaces 46. Each interface 46 is configured to operatively connect module 30 to a separate CCPU 28 via a separate data network 32. In this manner, system 26 would remain operative even in case of a failure in one of the redundant systems.

Modules 30 can further include one or more backup systems for controlling breakers 14 independent of CCPU 28. For example, system 26 may be unable to protect circuit 16 in case of a power outage in first source 52, during the initial startup of CCPU 28, in case of a failure of network 32, and other reasons. Under these failure conditions, each module 30 includes one or more backup systems to ensure that at least some protection is provided to circuit breaker 14. The backup system can include one or more of an analog circuit driven by second source 54, a separate microprocessor driven by second source 54, and others.

Figure 3:
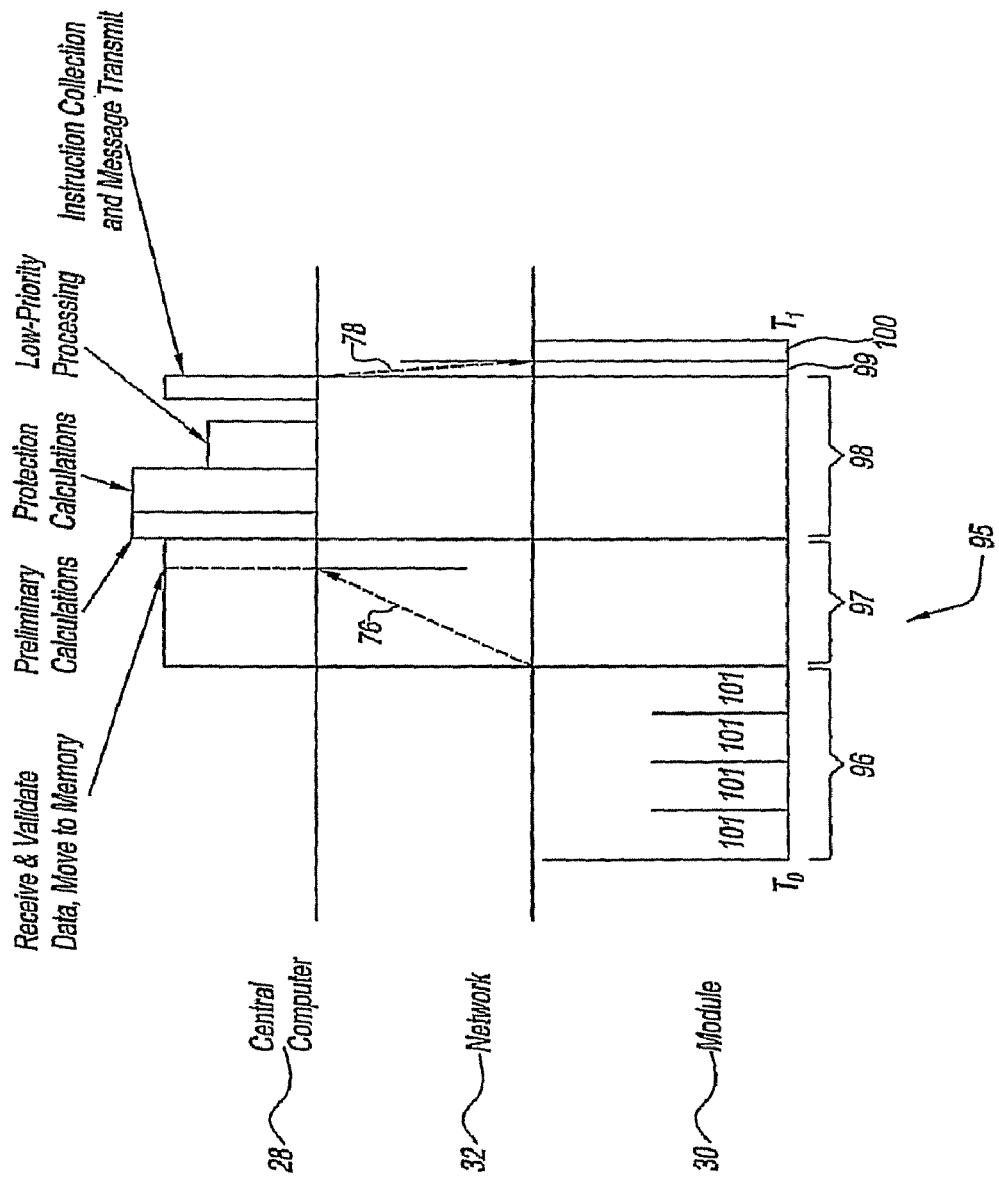
FIG. 3 is a response time for the protection system of FIG. 1.

Referring now to FIG. 3, an exemplary embodiment of a response time 95 for system 26 is illustrated with the system operating stably (e.g., not functioning in a start-up mode). Response time 95 is shown starting at T0 and ending at T1. Response time 95 is the sum of a sample time 96, a receive/validate time 97, a process time 98, a transmit time 99, and a decode/execute time 100.

In this example, system 26 includes twenty-four modules 30 each connected to a different circuit breaker 14. Each module 30 is scheduled by the phase-lock-loop algorithm and synchronization instruction 70 to sample its first signals 36 at a prescribed rate of 128 samples per cycle. Sample time 96 includes four sample intervals 101 of about 0.13 milliseconds (ms) each. Thus, sample time 96 is about 0.27 ms for data sampling and packaging into first message 76.

Receive/validate time 97 is initiated at the receipt of synchronization instruction 70. In an exemplary embodiment, receive/validate time 97 is a fixed time that is, for example, the time required to receive all first messages 76 as determined from the latency of data network 32. For example, receive/validate time 97 can be about 0.25 ms where each first message 76 has a size of about 1000 bits, system 26 includes twenty-four modules 30 (i.e., 24,000 bits), and network 32 is operating at about 100 Mbps. Accordingly, CCPU 28 manages the communications and moving of first messages 76 to the CCPU during receive/validate time 97.

The protection processes (i.e., process time 98) starts at the end of the fixed receive/validate time 97 regardless of the receipt of first messages 76. If any modules 30 are not sending first messages 76, CCPU 28 flags this error and performs all functions that have valid data. Since system 26 is responsible for protection and control of multiple modules 30, CCPU 28 is configured to not stop the entire system due to the loss of data (i.e., first message 76) from a single module 30. In an exemplary embodiment, process time 98 is about 0.52 ms.

CCPU 28 generates second message 78 during process time 98. Second message 78 can be twenty-four second messages (i.e., one per module 30) each having a size of about 64 bits per module. Alternately, it is contemplated by the present disclosure for second message 78 to be a single, multi-cast or broadcast message. In this embodiment, second message 78 includes instructions for each module 30 and has a size of about 1600 bits.

Transmit time 99 is the time necessary to transmit second message 78 across network 32. In the example where network 32 is operating at about 100 Mbps and second message 78 is about 1600 bits, transmit time 99 is about 0.016 ms.

It is also contemplated for second message 78 to include a portion of synchronization instruction 70. For example, CCPU 28 can be configured to send second message 78 upon receipt of the next synchronization instruction 70 from clock 72. In this example, the interval between consecutive second messages 76 can be measured by module 30 and the synchronization information in the second message, if any, can be used by the synchronization algorithm resident on microprocessor 42.

Once modules 30 receive second message 78, each module decodes the message and executes its instructions (i.e., send third signals 40), if any, in decode/execute time 100. For example, decode/execute time 100 can be about 0.05 ms.

In this example, response time 95 is about 1.11 ms. Of course, it should be recognized that system response time 95 can be accelerated or decelerated based upon the needs of system 26. For example, system response time 95 can be adjusted by changing one or more of the sample period, the number of samples per transmission, the number of modules 30, the message size, the message frequency, the message content, and/or the network speed.

It is contemplated by the present disclosure for system 26 to have response time 95 of up to about 3 milliseconds. Thus, system 26 is configured to open any of its circuit breakers within about 3 milliseconds from the time sensors 34 sense conditions outside of the set parameters.

Figure 4:
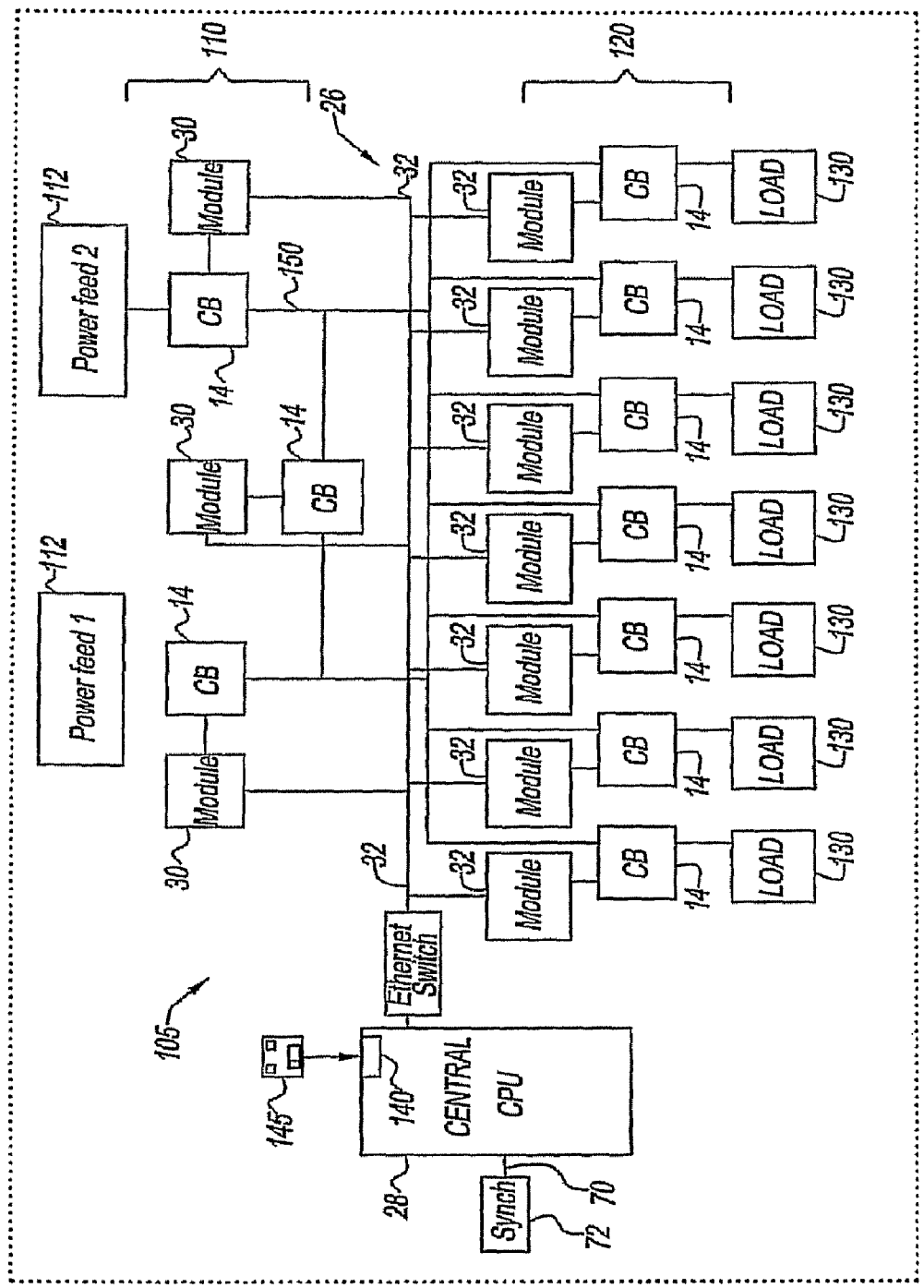
FIG. 4 is a schematic illustration of a multiple source power distribution system.

Referring to FIG. 4, an exemplary embodiment of a multi-source, multi-tier power distribution system generally referred to by reference numeral 105 is illustrated with features similar to the features of FIG. 1 being referred to by the same reference numerals. System 105 functions as described above with respect to the embodiment of FIGS. 1 through 3, and can include the same features but in a multi-source, multi-layer configuration. System 105 distributes power from at least one power feed 112, in this embodiment a first and second power feed, through a power distribution bus 150 to a number or plurality of circuit breakers 14 and to a number or plurality of loads 130. CCPU 28 can include a data transmission device 140, such as, for example, a CD-ROM drive or floppy disk drive, for reading data or instructions from a medium 145, such as, for example, a CD-ROM or floppy disk.

Circuit breakers 14 are arranged in a layered, multi-leveled or multi-tiered configuration with a first level 110 of circuit breakers and a second level 120 of circuit breakers. Of course, any number of levels or configuration of circuit breakers 14 can be used with system 105. The layered configuration of circuit breakers 14 provides for circuit breakers in first level 110 which are upstream of circuit breakers in second level 120. In the event of an abnormal condition of power in system 105, i.e., a fault, protection system 26 seeks to coordinate the system by attempting to clear the fault with the nearest circuit breaker 14 upstream of the fault. Circuit breakers 14 upstream of the nearest circuit breaker to the fault remain closed unless the downstream circuit breaker is unable to clear the fault. Protection system 26 can be implemented for any abnormal condition or parameter of power in system 105, such as, for example, long time, short time or instantaneous overcurrents, or excessive ground currents.

In order to provide the circuit breaker 14 nearest the fault with sufficient time to attempt to clear the fault before the upstream circuit breaker is opened, the upstream circuit breaker is provided with an open command at an adjusted or dynamic delay time. The upstream circuit breaker 14 is provided with an open command at a modified dynamic delay time that elapses before the circuit breaker is opened. In an exemplary embodiment, the modified dynamic delay time for the opening of the upstream circuit breaker 14 is based upon the location of the fault in system 105. Preferably, the modified dynamic delay time for the opening of the upstream circuit breaker 14 is based upon the location of the fault with respect to the circuit breakers and/or other devices and topology of system 105. CCPU 28 of protection system 26 can provide open commands at modified dynamic delay times for upstream circuit breakers 14 throughout power distribution system 105 depending upon where the fault has been detected in the power flow hierarchy and the modified dynamic delay times for the opening of each of these circuit breakers can preferably be over an infinite range. Protection system 26 reduces the clearing time of faults because CCPU 28 provides open commands at modified dynamic delay times for the upstream circuit breakers 14 which are optimum time periods based upon the location of the fault. It has been found that the clearing time of faults has been reduced by approximately 50% with the use of protection system 26, as compared to the use of contemporary systems.

Figure 5:
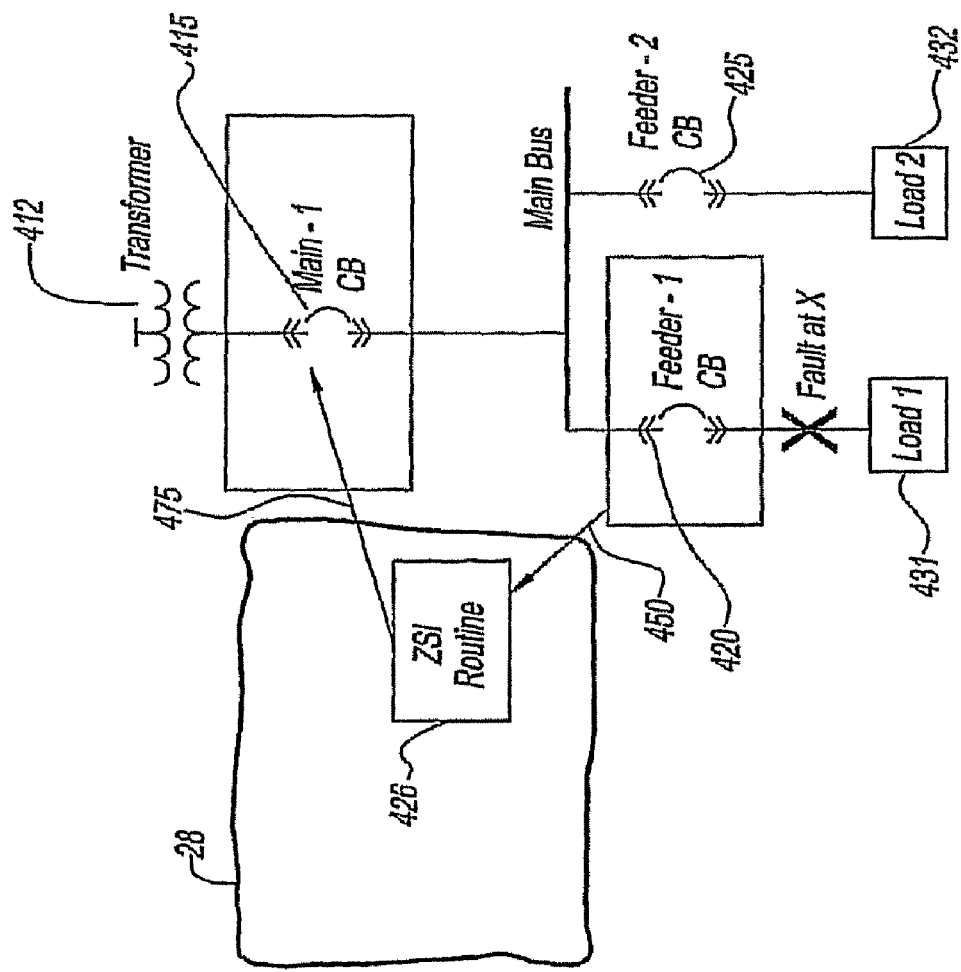
FIG. 5 is a schematic illustration of a portion of the system of FIG. 4 with a fault occurring downstream of Feeder Circuit Breaker 1.

Referring to FIG. 5, an exemplary embodiment of a portion of power distribution system 105 having a two-tier circuit with a main-1 circuit breaker (CB) 415 upstream of feeder 1 CB 420 and feeder 2 CB 425, which are in parallel. Power flow is from transformer 412 through main-1 CB 415, feeder 1 CB 420 and feeder 2 CB 425, to loads 431, 432. In the event of a fault X occurring between feeder 1 CB 420 and load 431, the existence of the fault and the location of the fault is determined by CCPU 28 in the manner as described above and as schematically represented by reference numeral 450. The nearest circuit breaker upstream of the fault X, i.e., feeder 1 CB 420, is placed into "pickup mode" by CCPU 28 and waits a pre-defined delay time before being opened. The modified dynamic delay time for the opening of main-1 CB 415 (the next nearest circuit breaker that is upstream of fault X) is then determined by zone selective interlock (ZSI) routine 426. In an exemplary embodiment, ZSI routine 426 is an algorithm, or the like, performed by CCPU 28. CCPU 28 determines the dynamic delay times for the opening of any number of upstream circuit breakers 14 and provides open or actuation commands to open the circuit breakers at the dynamic delay times.

In an exemplary embodiment, the modified dynamic delay time for main-1 CB 415 is determined from the sum of the pre-defined delay time and the clearing time of feeder 1 CB 420. The pre-defined delay time is set to best service load 431. The clearing time of a circuit breaker, such as feeder 1 CB 420, is dependent on the type of circuit breaker. The delay time for opening of main-1 CB 415 is then modified based upon the value determined by CCPU 28, as schematically represented by reference numeral 475. This allows feeder 1 CB 420 the optimal time for feeder 1 CB 420 to clear the fault X before main-1 CB 415 opens. The modified dynamic delay time determined by ZSI routine 426 reduces potential damage to system 105. The modified dynamic delay time also increases the efficiency of system 105 by delaying the opening of main-1 CB 415 for the optimal time period to provide the downstream circuit breaker, feeder 1 CB 420, with the full opportunity to clear the fault X so that other loads, i.e., load 432, can still receive power.

Figure 6:
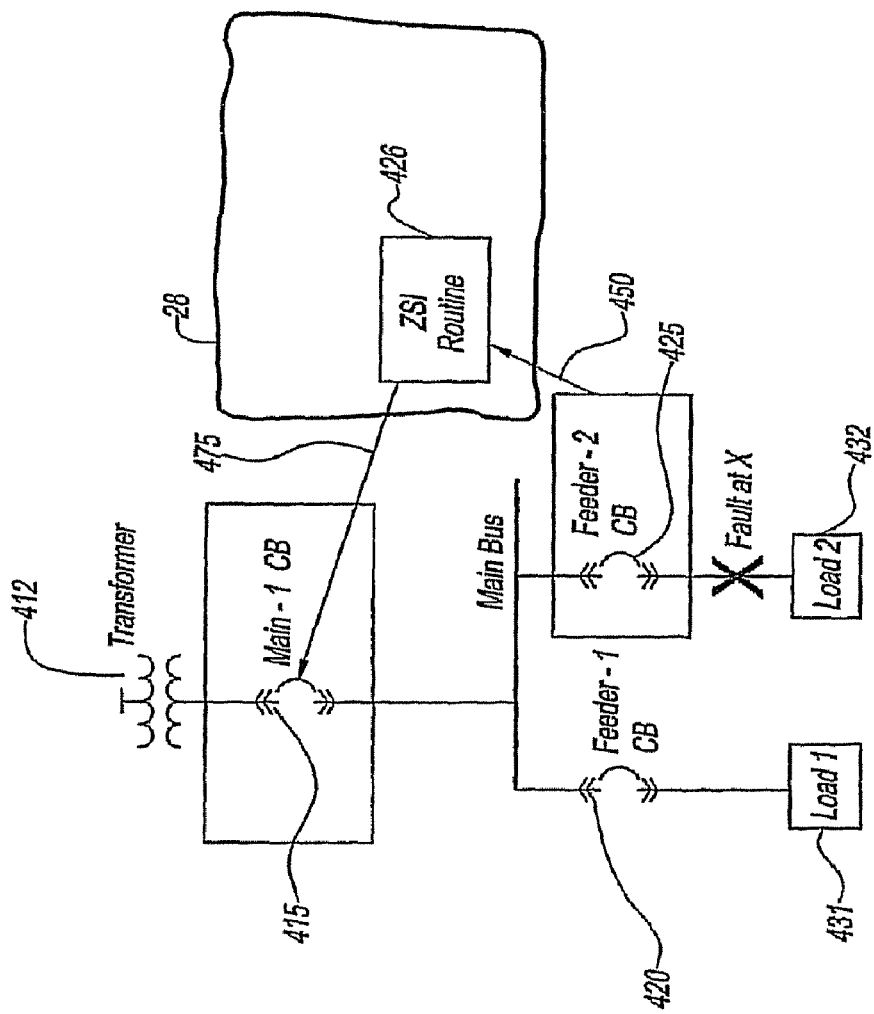
FIG. 6 is a schematic illustration of the portion of the system of FIG. 4 with a fault occurring downstream of Feeder Circuit Breaker 2.

Referring to FIG. 6, the portion of power distribution system 105 having a two-tier circuit is shown with a fault X occurring between feeder 2 CB 425 and load 432. In the manner described above, the existence and location of fault X is determined, as represented by reference numeral 450. ZSI routine 426 determines the dynamic delay time for opening of main-1 CB 415, as represented by reference numeral 475. Where feeder 2 CB 425 has a different pre-defined delay time set to best service load 432 and/or a different clearing time than feeder 1 CB 420, ZSI routine 426 will determine a different dynamic delay time for the opening of main-1 CB 415. The difference in the two modified dynamic delay times for the opening of main-1 CB 415 (FIGS. 5 and 6) is based upon the location of fault X in system 105 with respect to feeder 1 CB 420 and feeder 2 CB 425.

Figure 7:
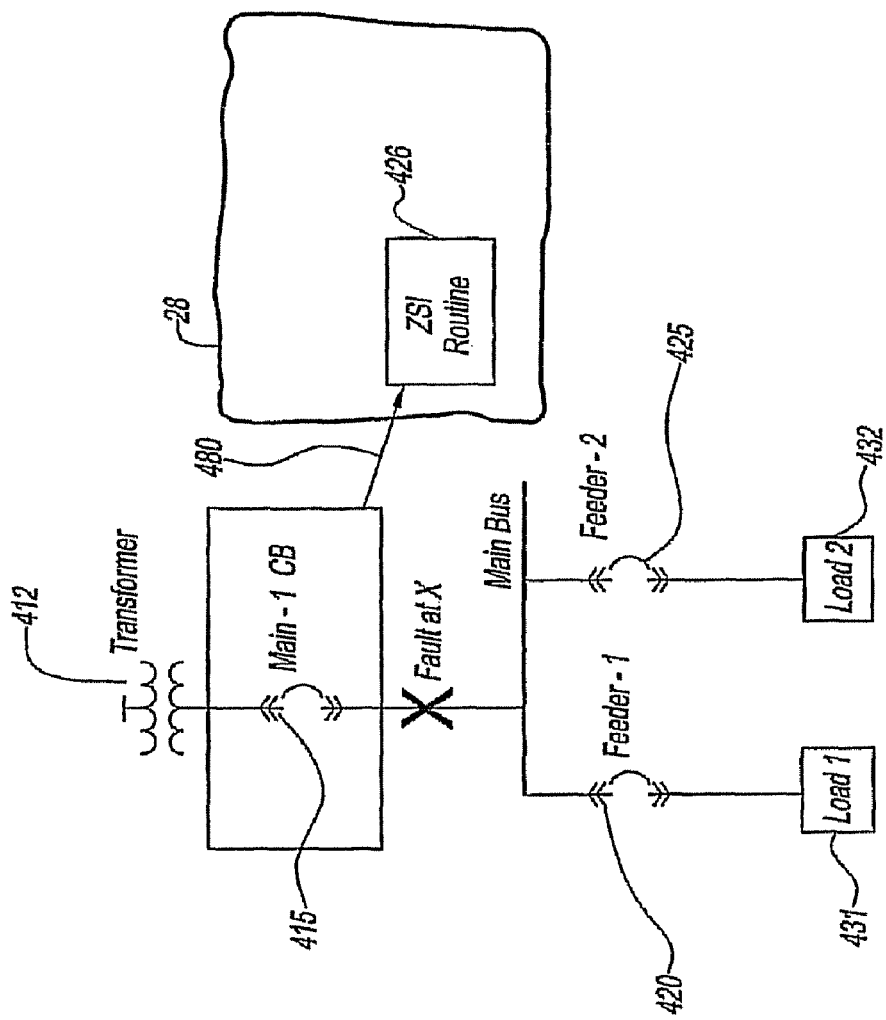
FIG. 7 is a schematic illustration of the portion of the system of FIG. 4 with a fault occurring downstream of Main Circuit Breaker 1.

Referring to FIG. 7, the portion of power distribution system 105 having a two-tier circuit is shown with a fault X occurring between main-1 CB 415 and either feeder 1 CB 420 or feeder 2 CB 425. In the manner described above, the existence and location of fault X is determined, as represented schematically by reference numeral 480. Since only main-1 CB 415 is available to clear fault X, ZSI routine 426 does not modify the dynamic delay time of the opening of main-1 CB and the main-1 CB will open in its pre-defined delay, which is typically much less than the dynamic time delay in the previous two examples.

Referring to FIGS. 4 through 7, CCPU 28 coordinates protection system 26 by causing the circuit breaker 14 nearest to the fault to clear the fault. Protection system 26 variably adjusts the dynamic delay time for opening of the upstream circuit breakers 14 to provide backup protection for the downstream circuit breaker nearest the fault. In the event that the downstream circuit breaker 14 nearest the fault is unable to clear the fault, the next upstream circuit breaker will attempt to clear the fault with minimal additional delay based upon its modified dynamic delay time. As shown in FIG. 7, when a fault occurs between a main circuit breaker and a feeder circuit breaker, e.g., main-1 CB 415 and feeder 1 CB 420, the minimal delay of the main-1 CB opening reduces the let-thru energy. This reduces system stress, damage and potential arc energy exposure of operating and service personnel while maintaining selectivity. In an exemplary embodiment, protection system 26 and CCPU 28 allow the implementation of ZSI routine 426 to modify the dynamic delay times for opening of any circuit breakers 14 throughout system 105 without the need for additional wiring coupling each of the circuit breakers to one another. CCPU 28 provides an open command to the upstream circuit breakers 14 for opening at dynamic delay times as determined by ZSI routine 426.

In an exemplary embodiment, ZSI routine 426 is performed at CCPU 28 and interacts with the individual protection functions for each module 30, which are also determined at the CCPU. ZSI routine 426 could also use pre-set clearing times for circuit breakers 14 or the clearing times for the circuit breakers could be determined by CCPU 28 based on the physical hardware, which is known by the CCPU. The CCPU 28 effectively knows the topology of power distribution system 105, which allows the CCPU to open the circuit breakers 14 at an infinite range of times.

Figure 8:
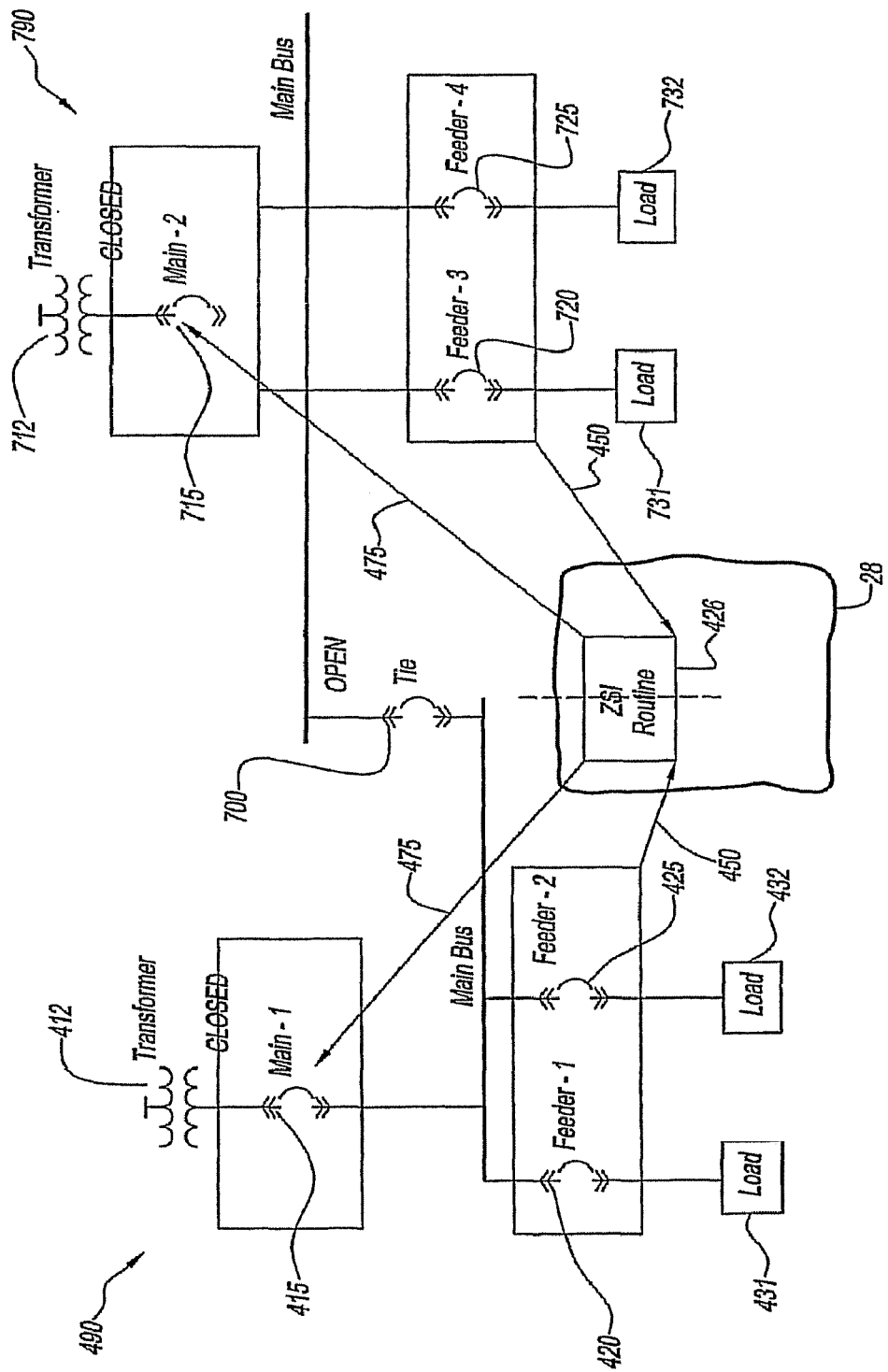
FIG. 8 is a schematic illustration of a portion of the system of FIG. 4 with a Tie Circuit Breaker in an open or tripped state.

Referring to FIG. 8, the portion of power distribution system 105 having a first two-tier circuit branch 490 and a second two-tier circuit branch 790 coupled by a tie CB 700 is shown. In this circuit, the opening of tie CB 700 has created two separate zones of protection in circuit branch 490 and circuit branch 790, which has a transformer 712. In the event of a fault, protection system 26 implements ZSI routine 426, as described above with respect to the two-tier circuit branch of FIGS. 5 through 7, independently for each of the circuit branches 490, 790.

Figure 9:
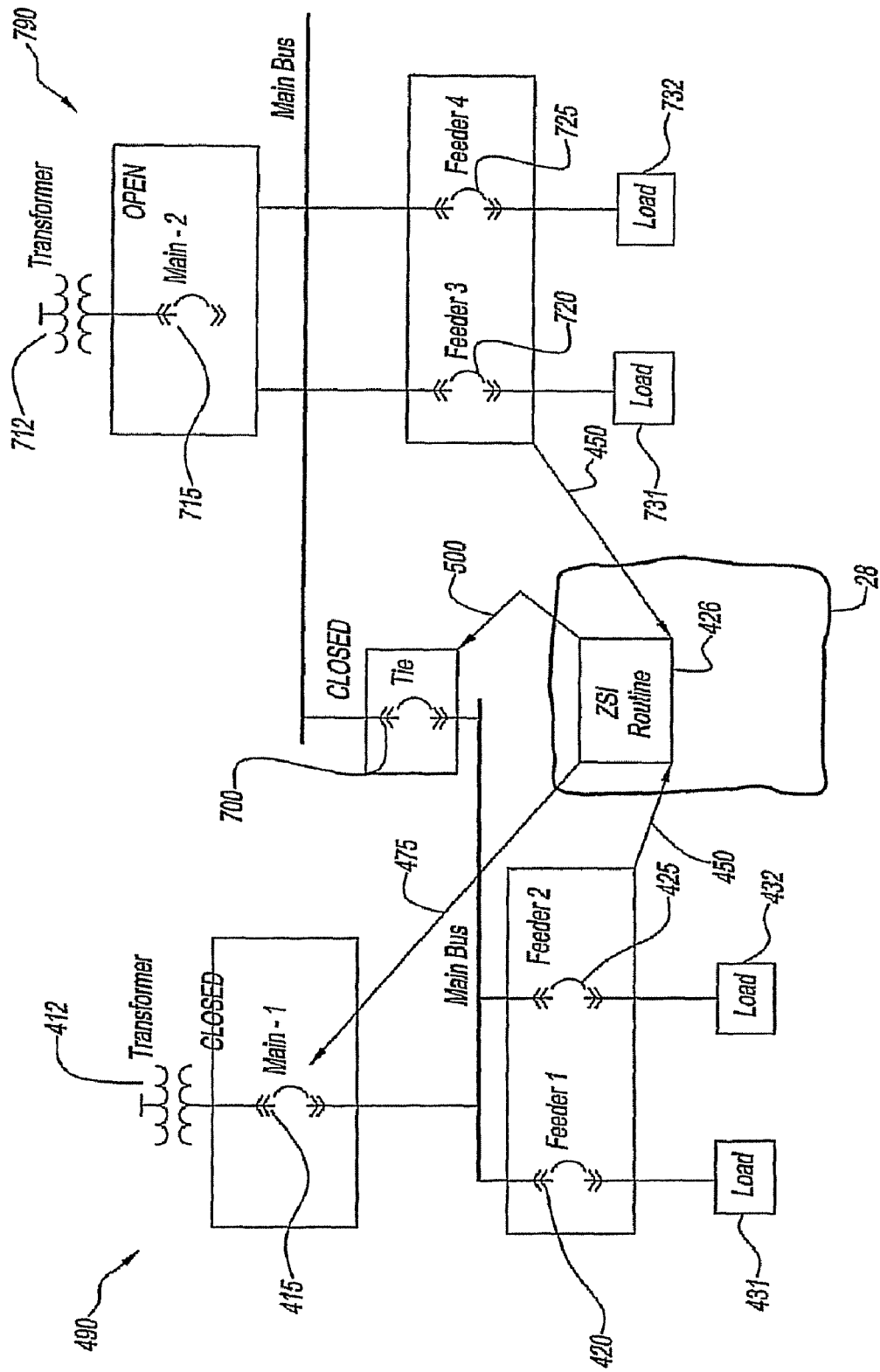
FIG. 9 is a schematic illustration of the portion of the system of FIG. 8 with a Main Circuit Breaker 2 in an open or tripped state.

Referring to FIG. 9, the portion of power distribution system 105 is shown when main-2 CB 715 is open and tie CB 700 is closed. The opening of main-2 CB 715 and the closing of tie CB 700 has created a new single three-tiered zone of protection with feeder 3 CB 720 and feeder 4 CB 725 in the third tier or level of circuit breakers. The status of all of the circuit breakers, including main-2 CB 715 and tie CB 700, is known by CCPU 28, as represented schematically by reference numerals 450. In the event of a fault (not shown) in first circuit branch 490 downstream of the feeder 1 CB 420 or the feeder 2 CB 425, the ZSI routine 426 would modify the dynamic delay time for the opening of main-1 CB 415, as described above with respect to FIG. 5 or FIG. 6.

In the event of a fault (not shown) in second circuit branch 790 downstream of the feeder 3 CB 720 (or the feeder 4 CB 725), the ZSI routine 426 would modify the dynamic delay time for opening of both the tie CB 700 and the main-1 CB 415. In an exemplary embodiment, the modified dynamic delay time for the opening of tie CB 700 is determined from the sum of the pre-defined delay time and the clearing time of feeder 3 CB 720 (or feeder 4 CB 725). The dynamic delay time for opening of tie CB 700 is then modified based upon the value determined by CCPU 28, as schematically represented by reference numeral 500. This provides feeder 3 CB 720 (or feeder 4 CB 725) with an optimal time to clear the fault before tie CB 700 is opened. Furthermore, the modified dynamic delay time for the opening of main-1 CB 415 is then determined from the sum of the modified dynamic delay time and the clearing time of tie CB 700. The dynamic delay time for opening of main-1 CB 415 is then modified based upon the value determined by CCPU 28, as schematically represented by reference numeral 475. This provides tie CB 700 with an optimal time to clear the fault before main-1 CB 415 is opened by the open command from CCPU 28.

In the event of a fault between tie CB 700 and feeder 3 CB 720 (or feeder 4 CB 725), the dynamic delay time for opening of main-1 CB 415 is modified from the sum of the pre-defined delay and the clearing time of tie CB 700. The delay for opening of tie CB 700 would not be modified since it is the nearest circuit breaker upstream of the fault for clearing the fault.

In an exemplary embodiment, the protection functions performed at CCPU 28, including ZSI routine 426, are based on state information or status of circuit breakers 14, as well as current. Through the use of protection system 26, the state information is known by CCPU 28. The state information is synchronized with the current and the voltage in power distribution system 105. CCPU 28 effectively knows the topology of the power distribution system 105 and uses the state information to track topology changes in the system. CCPU 28 and ZSI routine 426 utilizes the topology information of power distribution system 105 to optimize service and protection.

Of course, it is contemplated by the present disclosure for power distribution system 105 to have any number of tiers or levels and any configuration of branch circuits. The dynamic delay time for opening of any number of circuit breakers 14 upstream of the fault could be modified as described above based upon the location of the fault in the power flow hierarchy. Additionally, the zones of protection and the dynamic delay times can change as the power distribution system 105 changes. In an alternate embodiment, ZSI routine 426 can modify the dynamic delay time for opening of the upstream circuit breakers 14 based upon other factors using different algorithms. Protection system 26 allows for the dynamic changing of the delay times for opening of circuit breakers 14 throughout the power distribution system 105 based upon any number of factors, including the location of the fault. Protection system 26 also allows for the upstream circuit breaker 14 to enter the pickup mode as a function of the downstream circuit breaker 14 fault current and pickup settings as opposed to its own current and pickup settings.

The embodiments of FIGS. 1 through 9 describe the implementation of ZSI routine 426 at CCPU 28. However, it is contemplated by the present disclosure that the use of dynamic delay times for opening of circuit breakers 14 and/or the use of ZSI routine 426 can be implemented in other ways such as, for example, in a distributed control system with supervision by CCPU 28 or a distributed control system with peer to peer communications. In such distributed control systems, the delay time for opening of the upstream circuit breaker 14 will be modified to a dynamic delay time and/or based at least in part on the location of the fault in the power flow hierarchy. The dynamic delay times for the upstream circuit breakers 14 can also be determined and communicated to the upstream circuit breakers and/or circuit breaker actuators operably connected to the breakers.

In an exemplary embodiment, protection system 26 using CCPU 28 and ZSI routine 426 replaces the traditional time-current and fixed-delay protection while achieving both selectivity and tight backup protection. The feeder breakers (load-side) are set best to serve their loads reliably, but the main breakers and tie breakers (line-side) dynamically set their delay and current settings to best fit each feeder when that feeder circuit experiences a fault. The determination of a fault can be based on the feeder's settings and the sensors. In a traditional system, the sensing of a fault at the tie or main breaker is based on the settings at those trips and the current flowing through the respective circuit breakers. If the current magnitude is not sufficient to be recognized as a fault the trip units will not initiate a trip and hence provide no back-up function. There are no additional margins of safety or unnecessary time delays needed to allow the protection system 26 to operate selectively and provide protection to the mechanical limits of the devices used. Protect system 26 also applies within the short-circuit ranges of the devices in power distribution system 105. When the CCPU 28 senses a fault within the short-circuit range of any load-side device, the next line-side device is ready to operate immediately if the CCPU senses that the load-side device is not clearing the fault, even if the fault may not be in the instantaneous range assigned to the line-side device. This form of backup protection could save many cycles of fault current when a feeder breaker fails to open or if the fault occurs in the switchgear, without sacrificing selectivity.

In an embodiment, system 26 can be configured with circuit protection devices, circuit breakers 14 for example, located at service entrances and branch circuits. Load circuit over-current protection can be provided by module 30, acting as a trip unit in conjunction with CCPU 28, and current sensors 34 being integrated with the circuit breaker 14. These devices will continue to measure the circuit currents but the information will be digitized and broadcast over network 32. The network 32 communicates digital representation of the system parameters, current, and voltage, for example, from multiple points throughout the system and makes this information available to all control devices in the system. The network 32 can also communicate protective device status and has the ability to direct the protective device 14 to take action over the same digital network 32. For example, optimum switching between protective devices 14 may be accomplished by controlling centrally via CCPU 28 each circuit breaker 14 which has an adjustable time delay that is remotely controllable. Having the system parameters and the ability to control the devices enables this control and communication system to perform all of the functions currently performed by the multitude of control devices and point to point wiring used in known systems. As disclosed, this control functionality can be added virtually via software rather than physically through hardware.

A form of over-current protection is provided by the inverse time-over-current characteristics and fixed, or dynamic as discussed above, time delays that can be assigned to each circuit breaker 14 in the system 26. In a typical main and multiple-feeder system, the main breaker is set at the appropriate current setting to handle the maximum current that the bus may carry, or the sum of the currents of each of the feeders. However, the main breaker may also be set with a current setting equal to that of each of the feeder breakers and a time characteristic that allows it to provide backup protection to each individual feeder at that feeder's setting. The processor 28 would simultaneously monitor the current at the main bus and each of the branch circuits, reacting to an undesirable current at any point. This provides each branch circuit with secondary backup protection optimally set to supplement the primary protection with no compromise needed to achieve selectivity or to allow the bus current to flow unimpeded.

Through utilization of CCPU 28, control algorithms at a circuit breaker 14 can be duplicated at its respective feeder in the event it or one of its sub-components fails. This approach for the centrally controlled power system 26 works by the central controller's ability to adjust the circuit breaker trip curves in-situ, based on the current status of the system. Therefore, if a feeder breaker happens to malfunction, for example, the central controller will be notified and will perform adjustments to its supplying breaker. These adjustments include altering the supply breakers trip curves, and/or performing an interpolation calculation. This interpolation calculation involves collecting information from the supply breaker and its remaining feeder breakers. With this information, the conditions at the failed feeder breaker are determined.

In an exemplary embodiment of system 26, circuit breakers 14, busbars 12 and current sensors 34 are labeled with tags that identify that component's current rating (and potentially other identifying characteristics). These tags interface with the node electronics associated with the equipment cabinet in which the component is located. Using tags allows for identification of circuit breakers, current sensors and bus-bars based on tags. As such, an embodiment provides a mechanism for identifying the current rating of circuit breakers, current sensors and bus-bars, and a means for communicating these current ratings to appropriate components of the circuit breaker control and protection system (for example, breaker node, central controller).

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A method of providing protection against arc flash on a low voltage power circuit including a circuit breaker having a specified trip function for responding to a fault, the method comprising:
    overriding the specified trip function with an altered trip function determined by a central control processing unit based on a location of the fault relative to the circuit breaker such that arc energy in the fault during a trip with the altered trip function is reduced when compared with arc energy during a trip with the specified trip function;
    wherein the overriding the specified trip function with an altered trip function further comprises performing an adjustment of a trip curve of the circuit breaker in-situ via a human-machine-interface and the central control processing unit over a data network, the data network being disposed external of the circuit breaker; and
    identifying a characteristic associated with the circuit breaker via a tag associated with the circuit breaker, the tag being configured to interface with the data network to communicate the associated characteristic to the central control processing unit.

2. The method of claim 1, wherein the low voltage power circuit comprises a main circuit breaker and a feeder breaker, the circuit breaker having a specified trip function being one of the main breaker and the feeder breaker.

3. The method of claim 1, wherein the circuit breaker is positioned upstream from the fault.

4. The method of claim 1, wherein the altered trip function is a modified sum of a pre-defined delay time and a clearing time of a downstream circuit.

5. The method of claim 4, wherein the clearing time depends on a type of downstream circuit breaker.

6. The method of claim 4, wherein the sum is modified by a value determined by the central control processing unit.

7. A low voltage circuit breaker configured to protect from arc flash resulting from faults in a protected low voltage power circuit, comprising;
    separable contacts;
    at least one current sensor sensing current in the protected low voltage power circuit;
    a trip unit responsive to the at least one current sensor tripping open the associated separable contacts in response to a specified trip function;
    a transmission module in operable communication with the circuit breaker and a central control processing unit over a data network external to the circuit breaker, the transmission module being configured to transmit a communication signal, when in use, to override the specified trip function with an altered trip function, the altered trip function being determined by the central control processing unit based on a location of the fault relative to the circuit breaker such that arc energy in the fault during a trip with the altered trip function is reduced when compared with arc energy during a trip with the specified trip function; and
    wherein at least one of the circuit breaker and the at least one current sensor is labeled with a tag configured to interface with the data network to communicate a characteristic associated with the at least one of the circuit breaker and the at least one current sensor to the central control processing unit.

8. The method of claim 2, further comprising:
    collecting a characteristic associated with the main circuit breaker and the feeder circuit breaker at substantially a same instant of time.

9. The method of claim 8, wherein the collecting comprises communicating a synchronization instruction from the central control processing unit over the data network.

10. The method of claim 8, further comprising:
moving a collected characteristic to the central control processing unit prior to a next message being scheduled to arrive.

11. The low voltage circuit breaker of claim 7, wherein the tag is configured to interface with the data network via a synchronization instruction generated via a synchronizing clock associated with the central control processing unit.

12. The circuit breaker of claim 7, wherein the circuit breaker is positioned upstream from the fault.

13. The circuit breaker of claim 7, wherein the altered trip function is a modified sum of a pre-defined delay time and a clearing time of a downstream circuit.

14. The circuit breaker of claim 13, wherein the clearing time depends on a type of downstream circuit breaker.

15. The circuit breaker of claim 13, wherein the sum is modified by a value determined by the central control processing unit.

* * * * *